United States Patent [19]

Brandstätter

[11] 3,798,383

[45] Mar. 19, 1974

[54] RINGING DEVICE FOR AN ELECTRICAL TELEPHONE

[75] Inventor: Horst Brandstätter, Zirndorf, Germany

[73] Assignee: Georg Brandstätter, Zirndorf, Germany

[22] Filed: Feb. 4, 1972

[21] Appl. No.: 223,551

[30] Foreign Application Priority Data

Feb. 5, 1971 Germany .................. G 71 04 305.5
Nov. 29, 1971 Germany .................. P 21 59 003.4

[52] U.S. Cl. .................................. 179/84 R, 46/33
[51] Int. Cl. .................................. H04q 9/00
[58] Field of Search ................ 179/84 R, 1 H, 84 T; 340/402, 388; 46/33

[56] References Cited

UNITED STATES PATENTS

| | | | |
|---|---|---|---|
| 2,283,646 | 5/1942 | Nicholas | 179/84 R |
| 300,253 | 6/1884 | Hazazer | 340/402 |
| 2,686,835 | 8/1954 | Gottlieb | 179/84 R |

FOREIGN PATENTS OR APPLICATIONS

| | | | |
|---|---|---|---|
| 300,101 | 7/1919 | Germany | 179/84 R |

*Primary Examiner*—Kathleen H. Claffy
*Assistant Examiner*—Alan Faber
*Attorney, Agent, or Firm*—Hane, Baxley & Spiecens

[57] ABSTRACT

A telephone such as a toy telephone is provided with a ringing device in the form of the earpiece of the handset of the telephone.

9 Claims, 7 Drawing Figures

RINGING DEVICE FOR AN ELECTRICAL TELEPHONE

BACKGROUND OF INVENTION

1. Field To Which Invention Relates

The present invention relates to ringing devices for electrical telephones, more particularly toys telephones, and more particularly to such telephones of the type comprising a ringing device which comprises at least one ringing body or sounding body arranged in the magnetic field or a coil with an iron core, and an interrupter. Such telephones also comprise a handset to be held in the hand comprising an earphone part in which an earphone capsule is arranged which comprises a coil iron core and an earphone membrane.

2. The Prior Art

In known telephones the ringing device is arranged in the housing carrying the dial of the telephone.

SUMMARY OF INVENTION

One aim of the invention is to improve prior art telephones by reducing the number of their components and thus to provide a simplification.

In order to achieve this and other objects the invention provides that the ringing device is provided in the handset and preferably in the earphone capsule of the handset. It should be understood that the use of the term "ringing device" is not intended to imply that the ringing device can or cannot be used with alternating current.

Owing to the construction in accordance with the invention it is no longer necessary to provide a ringing device in the stand or rest part of the telephone carrying the handset. Ringing devices used in the prior art for telephones are call signal receivers which produce, in some cases, a buzzing sound when an AC or DC signal is received. Such devices are also referred to as buzzers. They comprise conventionally at least one sounding body which is caused to vibrate by the magnetic field of a coil with an iron core so that sound waves are produced for ringing. Ringing devices in accordance with prior art constructions require not only a coil, iron core and sounding body but also means for supporting their components.

This expenditure for a number of parts and the costs of assembling them can be dispensed with in accordance with a further embodiment of the invention in accordance with which the sounding body of the ringing device is arranged in the magnetic field of the coil, with an iron core, in the earphone capsule and is connected in the current circuit of the coil. This achieves on the one hand the advantage that in place of a respective coil with a core for the earphone capsule and the ringing device it is only necessary to provide one coil for both functions. On the other hand, owing to the use of the sounding body, arranged in the current circuit of the coil, of the ringing device it is possible to provide, without added circuitry, for the functions of audible reception and buzzing jointly using a three-wire cable, whose conductors are connected respectively with a connection of the ringing device, the earphone coil and, in the case of the third current conductor, with the other connections of the ringing device and the earphone capsule.

In accordance with a further feature of the invention the sounding body of the ringing device is arranged outside the earphone capsule in the receiver so as to make possible the use of a sounding body such as bell tongue, for which there is generally sufficient space in the earphone part of the receiver.

A particularly convenient construction of this arrangement of the ringing device in the handset of receiver of the telephone outside the earphone capsule can be provided in accordance with the invention by adopting the feature that the sounding body of the ringing device is arranged between the iron core of the coil and a contact tab or lug and in the rest position lies resiliently against the contact lug.

It has furthermore been found advantageous in accordance with the invention to adopt the feature that the sounding body of the ringing device has a membrane arranged inside the earphone capsule of the receiver of the telephone. The use of membranes as sounding bodies and their arrangement inside the earphone capsule provides for a particularly compact construction. This advantage is possessed by an embodiment of the invention in the case of which the sound capsule has an earphone membrane arranged at one end of the magnet coil and two membranes, arranged at opposite coil ends, for the ringing device, and both end faces of the sound capsule are closed by means of cover plates with openings.

A still more compact construction is provided in accordance with the invention in the case of which the sound capsule has two membranes which are arranged between one coil end and a cover plate which closes over the adjacent end faces of the sound capsule and is provided with openings, and of these one simultaneously forms one of the sounding bodies of the ringing device and the earphone membrane.

In accordance with a still further feature of the invention the membranes of the ringing device can be provided at their adjacent end faces with contacts which are preferably conical and as may be required in particular cases can be provided at the center of the membrane or removed from the center.

Finally, the ringing device for an electrical telephone with the above-mentioned features can be still further improved by adopting the feature that the membranes of the ringing device have at least one spring lug formed by openings in the membrane surface. With this feature it is possible to obtain a ringing device with a more pleasant tone than is the case with a smooth or flat membrane.

Since in the case of intercom or toy telephones the connecting wires between the individual telephones vary greatly in length and are often of a length between a few meters and 100 meters, there will be great variations in the voltage drop in the wires. Such variations lead to variations in the degree of excitation of the earphone coil, which has been found to be particularly disadvantageous for ringing systems. In the case of a short length of connecting wires the sounding body is inclined to "stick." On the other hand, excitation of the coil in the case of a very long connecting cable is too low to provide for proper actuation of the ringing device. Therefore, the ringing device should be capable of being adjusted to obtain optimum results for a given length of cable or connecting wires.

In accordance with the invention an adjusting device for varying the spring force and/or the distance between the sounding body and the earphone coil is provided in accordance with which the sounding body is arranged preferably opposite to the side of the earphone coil remote from the loudspeaker or microphone membrane.

Owing to the setting of the distance between the sounding body and the air gap of the respective iron core of the earphone coil or by adjusting the spring force, the ringing characteristics of the sounding body can be so regulated that it is in accordance with the excitation of the earphone coil as determined by the length of the telephone connecting cable.

In accordance with a further development of the invention there is the provision that the sounding body comprises a resilient lug, which in the rest position — in order to form the interrupter — has a contact projection lying on a counter-contact remote from the earphone coil, and the counter-contact preferably forms part of a contact membrane, which runs substantially parallel to the bottom or end wall of the earphone capsule. The lug itself can be formed in a simple manner by recesses in a sounding membrane.

The contact projection or shoulder or the resilient lug and the counter-contact should be arranged eccentrically with respect to the fixed lug end so that the adjusting device, passing through the bottom of the earphone capsule, which adjusts the spacing of the counter-contact from the coil, and thus the distance of the resilient lug from the coil, brings about a sufficient adjustment of the distance between the lug and the coil even in the case of small axial displacement.

This type of adjustment of the spacing between the resilient lug and the earphone coil can be arranged for in a particularly simple manner by adopting the feature of the invention that the adjusting means comprises an adjusting plate which can be turned from outside and is arranged between the contact membrane and the earphone capsule bottom and between a ramp part of the adjusting plate and the bottom of the earphone capsule a wedge-shaped ramp face is provided in such a manner that on twisting the adjusting plate the ramp part bends the contact membrane, and thus the resilient lug of the sounding membrane, in order to lead to a movement towards the earphone coil.

The adjustment plate substantially completely fills a circular opening in the bottom of the earphone capsule and has a lateral arm which extends between the bottom and the contact membrane and the arm is provided with a ramp, opposite which there is a wedge ramp face, provided on the inner surface of the bottom, concentrically curved about the axis of rotation of the adjusting plate.

It is an advantage if a second detent arm is provided which opposite the arm with the ramp and is also arranged between the contact membrane and the bottom of the earphone capsule and has a part, extending in the longitudinal direction, fitting into corresponding detent grooves in the inner surface of the bottom of the earphone capsule. This ensures that the adjustment plate maintains its respective position as set and cannot slide back owing to pressing forces applied to the ramp which force.

The accommodation of a ringing device in accordance with the invention in the earphone capsule can be carried out in accordance with the invention by adopting the feature that on an annular wall extending above the bottom of the earphone capsule axially directed arms are provided with hooks extending outwards, which fit resiliently into recesses of a wall ring placed over them and the wall ring has a lower edge which wedges in position lateral projections or shoulders which fit over the annular wall and form part of a carrying plate for the earphone coil and the latter in turn has a peripheral annular bead which lies against the sounding membrane, which rests on a spacing ring which lies on the contact membrane arranged in the bottom of the earphone capsule. On the sounding and contact membranes or membrane respective lug-shaped marginal tabs are provided which pass through upwardly opening recesses and on the one hand fix the azimuthal position of the membranes and on the other hand serve as contact tags for soldering on the electrical connecting wires. The earphone capsule or capsule housing is preferably made of plasticsmaterial, including the spacing ring between the membranes, so that no further insulation is necessary.

The wall ring connected with the earphone capsule via the resilient arms has at its top end an annular shoulder, against which the loudspeaker or microphone membrane lies which is held by a clamping ring. It is an advantage to use sound-damping material for rings placed on both sides of the loudspeaker or microphone membrane for supporting it. These rings can for example be made of foam material so that there is no direct mechanical contact between this membrane and the earphone capsule. By adopting this feature it is found that the acoustical qualities of the telephone can be substantially improved.

LIST OF SEVERAL VIEWS OF DRAWINGS

Further features, details and advantageous of the invention will be gathered from the following description of an embodiment, reference being had to the drawings.

FIG. 1 of the drawings is an illustration of the handset of an electrical telephone.

DESCRIPTION OF PREFERRED EMBODIMENTS

Figure 1:
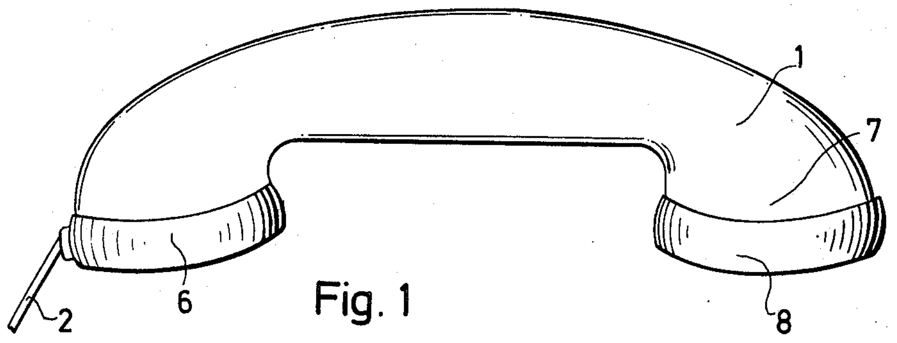
Figure 2:
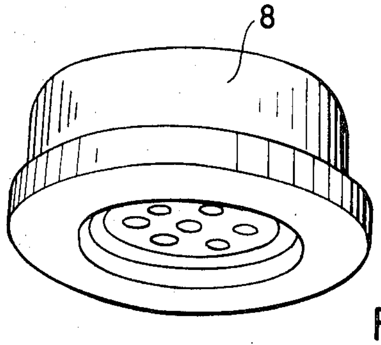
FIG. 2 shows in perspective an earphone capsule for the handset of a telephone.

The conventional handset 1 comprising a connecting cable 2, which comprises of conducting wires or conductors 3, 4 and 5, not shown particularly in FIG. 1, a microphone part 6 for a microphone and an earphone part 7 for receiving an earphone capsule 8, shown separately in FIG. 2.

Figure 3:
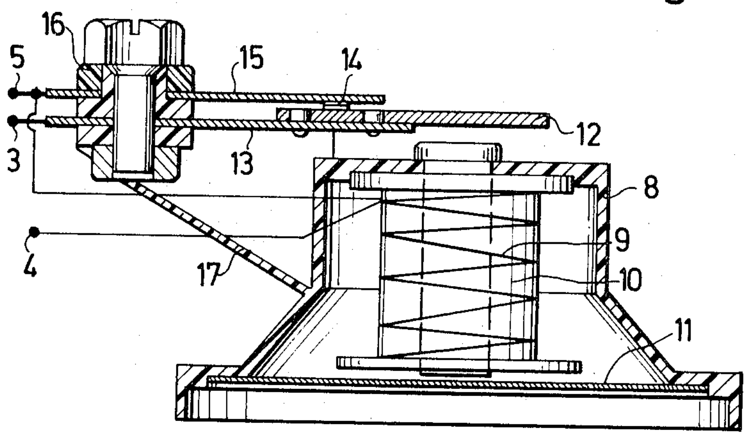
FIG. 3 is a longitudinal section through an earphone capsule with a sounding body, forming part of the ringing device, arranged outside the capsule.

The earphone or receiver capsule 8 in the case of the embodiment in accordance with FIG. 3 comprises a coil 9 with a core 10 and an earphone membrane 11, which is caused to vibrate by changes in magnet field strength owing to variations in the speaking current.

The ringing device is arranged outside the earphone capsule 8. The sounding body in the form of a tongue 12 is attached to a contact lug 13 and in the rest position presses resiliently via the contact 14 against the contact lug 15 and is located in the magnetic field of the coil 9 with the iron core 10. The contact lugs 13 and 15 are insulated from each other and arranged in a holding means 16 which is attached on the earphone capsule 8 by means of a connecting piece 17. The spatial arrangement of the earphone capsule 8 in relation to the tongue 12 of the ringing device is in accordance with the shape of the receiver 1 if, in order to avoid additional expenses with the apparatus, telephone receivers of conventional form are used for accommodating the ringing device.

In the case of the embodiments described in what follows membranes are used as sounding bodies of the ringing device and are arranged inside the earphone capsule 8.

The arrangement in accordance with FIG. 4 has, again, an earphone capsule 8 with a coil 9, an iron core 10 and an earphone membrane 11. The front side of the earphone capsule 8, adjacent to the earphone membrane 11, is covered over with the help of a covering plate 18 which has openings 19 for facilitating the emergence of the sound produced. The earphone capsule 8 is enlarged by an amount corresponding to a housing part 20, in which two membranes 21 and 22 are arranged for the ringing device. In the center of the membranes 21, 22 the contacts 23, 24 are arranged which are preferably of conical shape. As part of the invention it is also possible to provide for an eccentric arrangement for these contacts 23 and 24. The housing part 20 with the membranes 21 and 22 is shut off by a cover plate 25 on its end face remote from the earphone capsule 8. The plate 25 is provided with openings 26 in order to facilitate passage of the calling signals produced by the ringing device.

Figure 4:
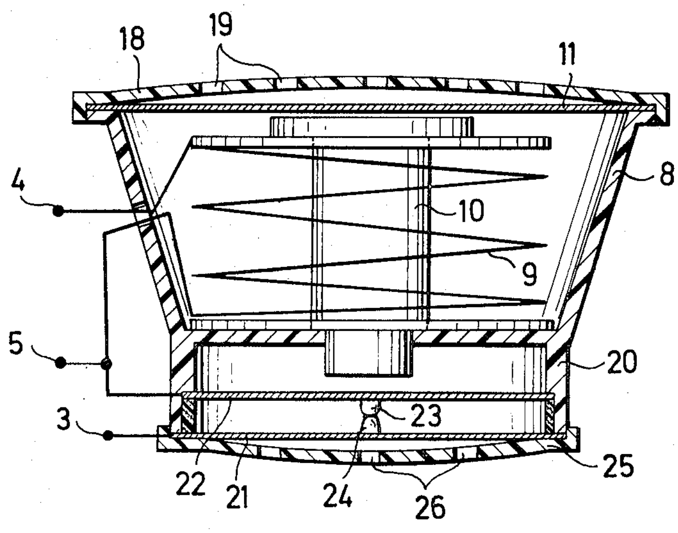
FIG. 4 is a longitudinal section through an embodiment in the case of which the earphone capsule has an earphone membrane and two membranes for the ringing device.
Figure 5:
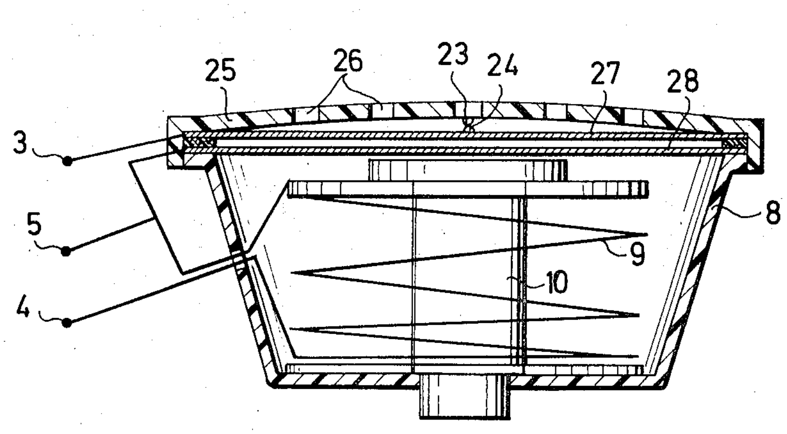
FIG. 5 is a longitudinal section through an earphone capsule with two membranes, of which one serves both as a sounding body of the ringing device and also as an earphone membrane.

The embodiment in accordance with FIG. 5 is simplified as compared with that shown in FIG. 4 in that it only has two membranes 27 and 28 in all for the functions of the ringing device and for listening in telephone conversation. This simplification is made possible by the fact that one of the two membranes, that is to say the membrane 28 adjacent to the coil 9, forms the one sounding body of the ringing device and at the same time is the earphone membrane. The earphone membrane and the ringing device membranes are only arranged at one end of the coil 9 so that, in consequence, in the case of this embodiment the projection or shoulder 20 of the housing or capsule is not required. Furthermore, it is only necessary to provide one covering plate 25, provided with openings 26, for shutting off one end face of the earphone capsule 8.

The current conductor 3 or wire is connected with a connection of the ringing device and its wire 4 is connected with one end of the earphone capsule coil. The wire 5 is simultaneously connected with the other end of the earphone capsule coil and the other connection of the ringing device. In order to simplify the drawing the reference numerals of these wires are arranged at the end points of the corresponding wires. The ringing device circuit lies between the connection points or terminals 3 and 5 while the earphone circuit lies between the connecting points 3 and 4. The method of operation of the telephone is as follows:

In the rest position of the ringing device in the case of the embodiment shown in FIG. 3 current flows from the connection point or terminal 5 through the contact lug 15 and the contact 14 to the contact lug 13 and then to the terminal or connection point 3. In this respect the contact lugs 13 and 15 and the tongue 12 lie resiliently against one another. Consequently a current flows through the coil 9 between the terminals 5 and 4. The flow of the current causes the build up of a magnetic field about the coil 9 with the core 10. In consequence the tongue 12 is attracted by the coil core 10 and the contact 14 is separated so that the coil 9 is deprived of current and the magnetic field ceases to exist. The tongue 12 is separated from the core 10 owing to the spring force and returns into the rest position. This procedure is repeated as long as voltage is applied to the terminals and causes the tongue 12 to vibrate or sound.

In the case of an embodiment in accordance with FIGS. 4 and 5 the contacts 23 and 24 are closed in the rest position of the ringing device so that the current flows between the terminals 3 and 5 through the membranes 21, 22 and 27, 28, respectively, via the wire leading from the terminal 5 to one end of the coil through the coil 9, whose end opposite to the ringing device is in connection with the terminal 5. The magnetic field produced by the flow of current in the coil 9 causes the membrane 22 and 28, respectively, to be attracted by the coil core 10 while the contacts 23 and 24 are separated and the flow of current through the coil 9 is interrupted. When the coil 9 is deprived of current, the magnetic field surrounding it collapses and the membrane 22 and 28, respectively, are no longer attracted by the coil core 10 and pass resiliently back into their rest position. Thus, the contacts 23 and 24 come to touch again and current can flow from the terminal 3 through the membrane 21, 22 and 27, 28, respectively, into the coil. The magnetic field produced in consequence causes the coil core 10 to attract the membrane 22 and 28, respectively, so that the contacts 23 and 24 are separated. The described flow of current and interruption of it is repeated and in consequence the membranes of the ringing device are moved as long as voltage is applied to the connecting terminals.

In a corresponding manner the earphone membranes 11 (FIGS. 3 and 4) and 28, respectively (FIG. 5) are caused to vibrate by the variations in the magnetic field of the coil 9 which are caused by changes in the speaking current.

Figure 6:
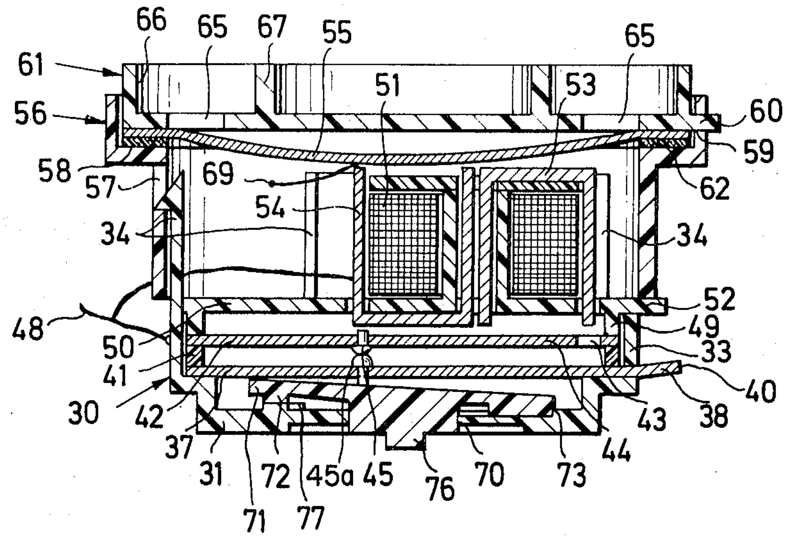
FIG. 6 is a section through an earphone capsule with a different form of the ringing device.
Figure 7:
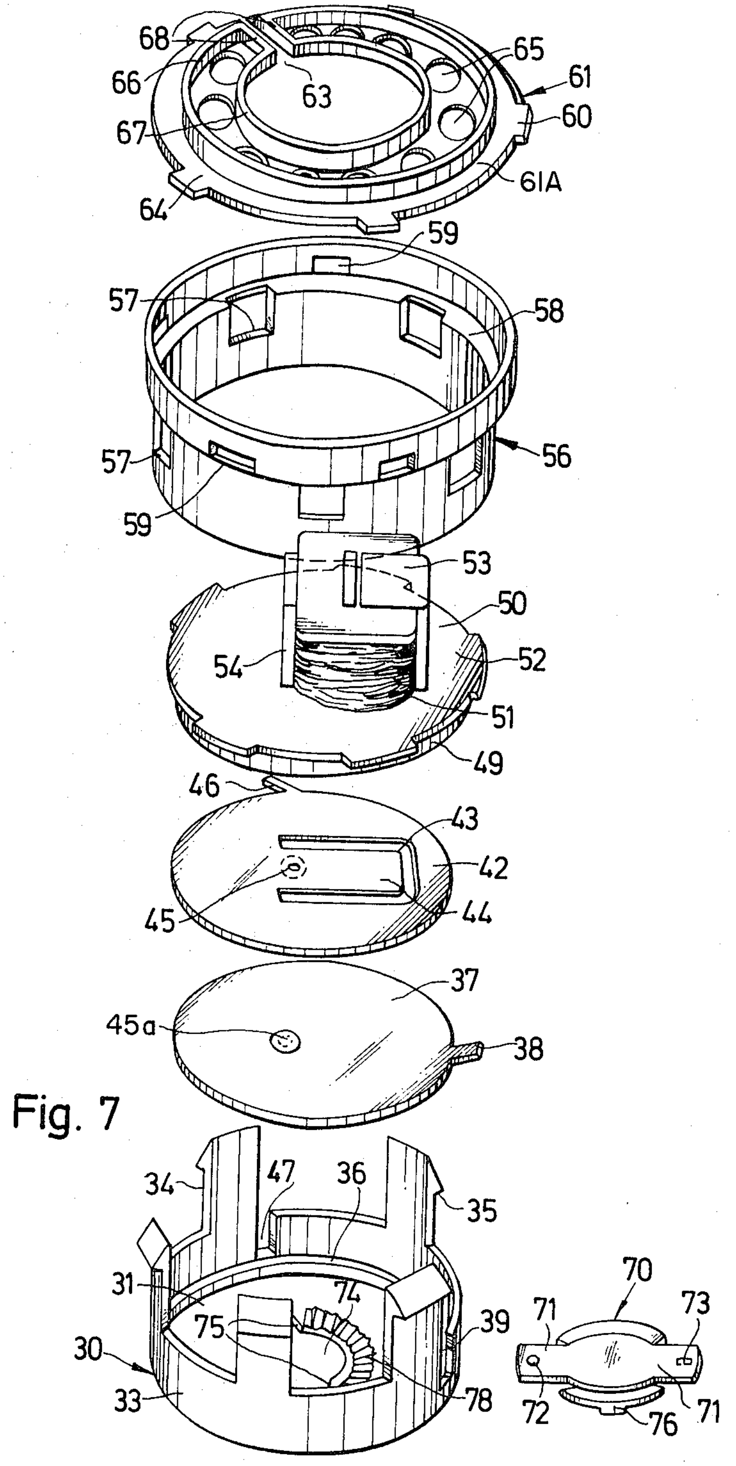
FIG. 7 is a perspective, exploded view of the earphone capsule in accordance with FIG. 6.

In the preferred case of the embodiment in accordance with FIGS. 6 and 7 the earphone capsule or capsule housing consisting of injection molded parts has a lower part 30 with the capsule bottom 31 with an annular wall 33 extending above it, from which the equally molded axially directed arms 34 extend. These arms are provided with outwardly extending hooks 35.

An annular circular shoulder raised by the bottom 31 and denoted by reference numeral 36 serves for applying the contact membrane 37, forming one part of the interrupter of the ringing device. The contact membrane 37 has integrally molded marginal tab 38 which pass through an opening 39, made in the annular wall 33, so as to extend as far as the level of the shoulder 36. This fixes on the one hand the azimuthal position of the contact membrane 37, something which is of significance owing to the eccentric arrangement of the contact button 45*a*, (a counter-contact) and on the other hand provides for the possibility of connecting an external connecting lead or wire 40 by soldering onto this marginal tab 38 to provide an electrical connection with the contact membrane 37.

On the contact membrane 37 a plastics material ring 41 is applied, on which there rests a sounding membrane 42 in which an U-shaped lug 44 is formed by an U-shaped cut 43. This lug also carries a raised contact button 45. The thickness of the spacing ring 41 is so choosen that the contact buttons 45*a* and 45 make contact with each other electrically. Furthermore, the sounding membrane 42 is provided with a tongue-shaped marginal tab 46, which passes through an opening 47 in the annular wall 33 and simultaneously serves for setting the azimuthal position of the sounding membrane 42 and for soldering on an electrical connecting line or wire 48.

On the upper side of the sounding membrane 42 there rests an annular shoulder 49 formed integrally on a support plate 50 for the earphone coil 51. The earphone coil 51 is provided with projections or shoulders 52 at the side which pass over the upper edge of the annular wall 33. The arrangement of these shoulders is made perferably in this respect such that on the placing in position of the support plate 50 the membranes 37 and 42 are so aligned automatically that the downwardly opening U-shaped yoke 53 of the iron core of the coil 51 comes to be eccentrically placed and is opposite to the end of the resilient lug 44, while the upwardly opening iron yoke 54 which lies symmetrically with respect to the middle serves for actuating the microphone membrane 55.

A wall ring 56, whose inner diameter corresponds to the outer diameter of the annular wall 33, is pushed from above over the arrangement as described so that the hooks 35 of the arms 34 fit resiliently into openings 57 which are so arranged that accordingly the lower edge of the wall ring 56 is pressed resiliently onto the shoulders 52 of the carrying plate 50 and thus also the underlying membranes 42 and 37 are jammed in position. In the upper part, which is offset to form an annular shoulder 58, of the wall ring 56 openings 59 are provided, into which extensions 60 of a clamping ring 61 can fit.

The annular shoulder 58 serves as a rest for the edge of the microphone or loudspeaker membrane 55 with the interposition of a ring 62 of vibration damping material. Over the microphone membrane 55 the gripping or clamping ring 61 is fitted, possibly with the arrangement of a second ring of sound damping material between the two.

The clamping ring 61 consists of an annular plate 61A with a slot 63 and lateral extensions or shoulders 60, in which openings 65 are provided for improved sound transmission. In order to stiffen this arrangement, annular ribs 66 and 67 are provided which are adjacent to the slot 63 and are connected by wall ribs 68 with each other. Owing to the pressing together of the ribs 68 in relation to each other the clamping ring 61 can be easily mounted in the upper part of the wall ring 56, following which on releasing the ribs 68 the clamping ring 61 springs back into its original position so that the shoulders or projections 60 fit into the openings 59 and thus hold the membrane 55 fast.

Between the connection 48, (the voice current terminal) which is connected with the sounding membrane 42 and also with the lower end of the earphone coil 51, and the connection 69 (the common terminal) the voice current is applied when the earphone capsule is being used as a loudspeaker capsule.

If on the other hand an electrical signal is applied between the connections or terminals 69 and (40 the ringing current terminal), a current flows from the line or wire 40 via the contact membrane 37, the contact buttons 45*a* and 45 which lie against one another to make contact, the sounding membrane 42 and the connection between the latter and the earphone coil 51 to the terminal or connection 69. The excitation causes the coil 51 attract, owing to the magnetic field of the iron yoke 53, the resilient lug 44 towards the coil 51 so that the contact between the contact buttons 45a and 45 is interrupted and the current is also interrupted. The lug 44 springs back again into its starting position and the operation begins again so that in this manner a ringing device with automatic interruption is provided.

In accordance with the distance between the two interconnected telephone devices and the voltage drop depending upon the length of the connecting cable the voltage between the terminals 40 and 69, and thus the excitation of the coil 51 can vary greatly. If in the case of a predetermined spring force of the resilient lug 44 its distance from the coil 51 is so set that the strong excitation, occurring in the case of small cable lengths, brings about clear operation of the ringing device, the same setting will not be suitable when substantially greater lengths of connecting cable are used, since in this case the coil excitation were no longer be sufficiently large. In order to provide reliably for an optimal operation of the ringing device there is the provision in accordance with the invention of an adjusting means which makes it possible to regulate the distance between the resilient lug 44 from the earphone coil 51. This adjusting means comprises an adjusting plate 70, inserted into the bottom 31 of the earphone capsule, with lateral arms 71, of which one has a downwardly directed cam 72 and the other has an downwardly directed connecting piece 73. The adjusting plate 70 is inserted from below into an opening 74 of the earphone capsule bottom 31 with lateral slotted shoulders or projections 75 and by turning on the handle 76 can be so turned that the lateral arms 71 fit in between the earphone capsule bottom 31 and the contact membrane 37. During the course of this twisting the cam 72 slides on a curved wedge-shaped cam face 77, while the side, remote from the cam 72, of the arm 71 lies against the lower surface of the contact membrane 37. In accordance with the degree of twisting of the adjusting plate 70 the contact membrane 37 is pressed to a greater or lesser extent upwards in accordance with the actual height of the wedge-shaped cam surface above the inner surface of the bottom, so that owing to the engagement of the contact buttons 45a and 45 the resilient lug 44 is brought to a greater or lesser extent up to the coil 51.

On twisting the adjusting plate 70 the connecting piece 73 of the arm 71 slides over detent grooves 78 of the bottom face of the earphone capsule so that on releasing the handle 76 of the adjusting plate 70 the latter remains in the respectively set position.

The invention is not limited to the embodiment shown. Thus, in the case of an identical construction of the ringing device it would also be possible to provide for a different type of means for adjusting the distance of the lug 44 on the coil 51. However, the invention can be put into practice with completely differently constructed ringing devices and it would be possible, more particularly, to provide for a regulation of the spring strength, for example by adjustment of the pivot point and thus the effective length of the resilient lug, in the place of adjustment of the distance between the vibrating lug and the coil.

I claim:

1. In a telephone including a handset having a mouthpiece with a mouthpiece capsule and an earpiece with an earpiece capsule, apparatus within one of said capsules comprising:

an exciter coil for generating a magnetic field;

an iron core associated with said exciter coil;

a first diaphragm on one side of the said exciter coil, said first diaphragm being associated with the voice communication function of the telephone;

a resilient ringing device on the other side of said exciter coil and movable under the influence of a magnetic field, said resilient ringing device being electrically connected to said exciter coil and comprising a sounding membrane with cuts forming a resilient lug, a first contact on said resilient lug and a contact means cooperatively opposite said first contact for forming a circuit interrupter; and adjustment means for moving said resilient ringing device with respect to said exciter coil to modify the influence of a magnetic field generated by said exciter coil of said resilient ringing device.

2. The apparatus of claim 1 wherein said first contact and said contact means are arranged eccentrically adjacent the fixed end of said resilient lug.

3. The apparatus of claim 1 wherein said adjustment means extends through the exposed bottom of said capsule and includes means to adjust the distance of said contact means from said exciter coil and thereby the position of said resilient lug.

4. The apparatus of claim 3 further comprising a contact membrane for supporting said contact means and wherein said adjustment means comprises an adjusting plate which can be turned from outside said capsule and is arranged between said contact membrane and the bottom of said capsule, and a wedge-shaped cam provided between said adjustment plate and the capsule bottom so that a rotation of said adjustment plate is accompanied by a bending of said contact membrane and thus of said resilient lug of said sounding membrane towards said exciting coil.

5. The apparatus of claim 4 wherein said adjustment plate occupies a substantially circular opening in the capsule bottom and has a lateral arm extending between said bottom and said contact membrane, the inner surface of said capsule bottom being provided with a wedge-shaped cam comprising a curved abutment face, said arm being provided with an abutment ramp which is opposite said curved abutment face which is curved so as to be concentric to the axis of rotation of said adjustment plate.

6. The apparatus of claim 5 further comprising a detent arm arrange in opposite relationship to said lateral arm, said capsule being provided with detent grooves in its bottom inner surface, said detent arm having a part adapted to fit into said detent grooves.

7. The apparatus of claim 6 further comprising arms axially extending above an annular wall formed on the bottom of said capsule, outwardly extending hooks on the axial arms, a wall ring having recesses which are resilient engaged by said axial arms, a carrying plate for said exciter coil, and lateral extensions on said carrying plate which are engaged by the lower wall of said ring wall.

8. The apparatus of claim 7 wherein said carrying plate for said coil has a peripheral annular lip resting on said sounding membrane, a spacing ring on said contact membrane mounted in the bottom of the capsule, said spacing ring supporting said sounding membrane, said apparatus further comprising lug-shaped marginal tabs which are integrally molded on said sounding and contact membranes and passing through upwardly opening recesses in said annular wall.

9. The apparatus of claim 8 wherein said wall ring includes an annular shoulder at its upper end for supporting said first diaphragm, and further comprising a gripping ring for retaining said wall ring in position.

* * * * *